Oct. 31, 1967  J. R. VOIGHT  3,349,486
TRIMMER FOR TRIMMING THE EDGES OF WALLPAPER AND THE LIKE
Filed Aug. 18, 1965
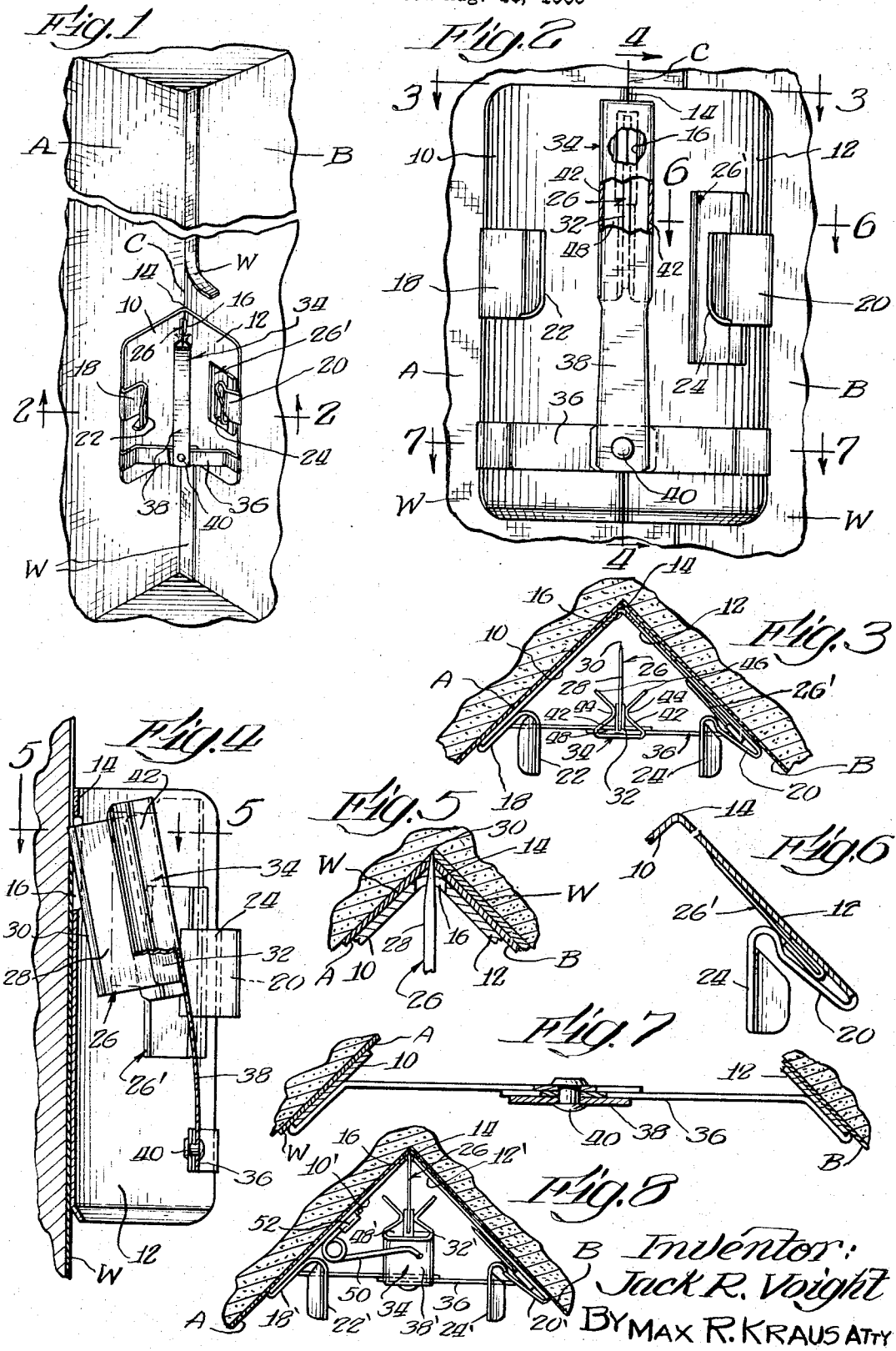
Inventor:
Jack R. Voight
By Max R. Kraus Atty

United States Patent Office 3,349,486
Patented Oct. 31, 1967

3,349,486
TRIMMER FOR TRIMMING THE EDGES OF WALLPAPER AND THE LIKE
Jack R. Voight, 202 E. Ash St., Lombard, Ill. 60148
Filed Aug. 18, 1965, Ser. No. 480,648
4 Claims. (Cl. 30—294)

ABSTRACT OF THE DISCLOSURE

A trimming device comprising a pair of guide surfaces substantially at right angles to each other, each having a finger engaging member in a fixed position relative to the surfaces whereby the device is held by two fingers, and a depressible cutting member positioned between the guide surfaces for engagement by a third finger for depressing the cutting member through a slot for trimming.

---

This invention relates to a trimmer for trimming the edges of wallpaper and the like.

One of the objects of this invention is to provide a trimmer which will trim the edge of the wallpaper after it has been pasted and hung or applied to the wall.

Another object of this invention is to provide a trimmer which may be used to cut or trim paper, cloth, or the like.

Another object of this invention is to provide a trimmer provided with guide surfaces, with the cutting implement positioned relative to said guide edges so that by moving the trimmer along the baseboard, ceiling, door or window case, the wallpaper is cut at the edge accurately and cleanly.

Another object of this invention is to provide a device of the foregoing character which is very simple and inexpensive to produce and easy to operate.

Other objects will become apparent as this description progresses.

In the drawings:

FIG. 1 is a view showing the trimmer of this invention applied in trimming the edges of the wallpaper from the wall surface of a room.

FIG. 2 is a plan view taken on line 2—2 of FIG. 1.
FIG. 3 is a view taken on line 3—3 of FIG. 2.
FIG. 4 is a view taken on line 4—4 of FIG. 2.
FIG. 5 is a view taken on line 5—5 of FIG. 4.
FIG. 6 is a view taken on line 6—6 of FIG. 2.
FIG. 7 is a view taken on line 7—7 of FIG. 2, and
FIG. 8 is a view of a modification.

The unit may be formed of metal or the like and comprises a pair of guide walls 10 and 12 which are positioned at right angles to each other, forming a central edge 14 where the two walls are joined. The central edge 14 has a short slot 16 extending adjacent the front end but spaced from the front end through which the cutting edge of the cutting implement is adapted to protrude, as will be presently described.

Extending inwardly from each of the walls 10 and 12 are inwardly turned members generally indicated at 18 and 20 respectively, which are generally of U or V-shaped configuration, with the sides thereof having inturned end flanges 22 and 24 respectively. The members 18 and 20 are engaged by a person's thumb and forefinger in holding and operating the trimmer.

The cutting implement generally indicated at 26 is one which is used in safety razors and is put out by various companies. It comprises a blade 28 having a cutting edge 30. The upper edge of the blade is covered by a reversely bent metal strip 32 which is crimped to the blade and forms the head of the blade. The cutting implement 26 is held by a holder generally indicated at 34 which comprises a generally T-shaped member in plan which includes a cross-member 36 and a stem portion 38. The cross-member 36 is secured at its opposite ends to the guide walls 10 and 12. The stem portion 38 is centrally secured as at 40 to the cross-member 36.

The stem is provided adjacent the forward end thereof with oppositely positioned downwardly extending side flanges 42 which are inclined toward each other as at 44 and then are turned outwardly as at 46 to provide a hollow head 48 within which is positioned the head of the blade. The flanges 42 grip the blade head to retain the blade in the holder in a fixed position. The T-shaped blade holder will aline the cutting blade with the slot 16. The stem 38 of the holder is made of metal or the like and has a sufficient flexibility or "give" so that by manually pressing against same with a person's finger the stem flexes downwardly to permit the forward portion of the blade to enter the slot 12 and extend therethrough at an angle, as best shown in FIG. 4.

The trimming device is held in the hand with the person's thumb and middle finger engaging the members 18 and 20 and the forefinger engaging the stem 38. By manually depressing the forward end of the stem, the stem will be flexed to cause the cutting edge 30 of the blade to partially protrude at an angle through the slot 16, as shown in FIG. 4. Releasing the finger pressure on the stem 38 will cause the stem to return to its normal position, as shown in FIG. 3, where the cutting blade is elevated, as therein shown, and is in out-of-the-way position in relation to the slot 16. When the blade is inserted in the stem of the holder it will be locked into position. The blade may be replaced when desired. An extra cutting implement or blade 26' may be stored and held by the finger engaging member 20, as best shown in FIG. 6.

The operation of this device should be clear from the foregoing, however, briefly described, if the trimmer is to be used for trimming the edges of wallpaper, as shown in FIG. 1, the trimmer is positioned in the corner of the room, with the guide walls 10 and 12 engaging the adjacent walls A and B of the room and the central edge 14 of the trimmer fitting into the corner C of the room. Depressing the stem 38 will cause the cutting edge of the blade to extend through the slot 16, as shown in FIGS. 4 and 5, and engage the wallpaper W. By moving the trimmer downward the cutting edge 30 will cut and trim off the excess wallpaper so that when trimmed the wallpaper will be flush with the corner. This same procedure is followed in connection with trimming the wallpaper at the juncture of the wall and the ceiling, or between the baseboard and the wall, or between the door jamb and the wall, or between the window frame and the wall.

As will be seen, the cutting edge extends at an angle through the slot when the blade holder is depressed. This forms the front edge of the trimmer and the trimmer is pulled along rearwardly from the front edge or in a downward direction, as shown in FIG. 1, to effect the aforementioned cutting. The person's fingers will bear against the end flanges 22 and 24 when the trimmer is thus moved.

FIG. 8 shows a modified construction in that means are provided for retaining the cutting implement in its cutting position so that the edge of the blade extends through the slot 12. Instead of using manual finger pressure to maintain the cutting implement in the cutting position, as shown in FIGS. 4 and 5, a spring member 50 is secured as at 52 to one of the guide walls 10' of the trimmer and this spring member applies a constant downward pressure on the stem 38' of the blade holder to hold the blade in cutting position. To release the pressure the spring 50 may be turned so that it disengages the stem 38' and this will permit the blade holder to occupy the position shown in FIG. 3.

It will be understood that while the invention has great advantage for trimming off the excess edges of wallpaper, it may also be used for cutting and trimming paper, cardboard, and the like. Where so used it is run along a guide line or a guide edge.

With this invention the wallpaper may be trimmed at a considerably increased speed in comparison to the old well-known methods of trimming.

It will be understood that various changes and modifications may be made from the foregoing without departing from the spirit and scope of the appended claims.

What is claimed is:

1. A trimming device comprising a pair of guide surfaces positioned substantially at right angles to each other and defining a central edge between said guide surfaces, a slot within said central edge, a cutting member having a cutting edge, means for supporting said cutting member between said guide surfaces, said means including a depressible member manually engageable by a finger which upon depression will cause the cutting edge of said cutting member to extend through said slot to engage the material to be trimmed, and a pair of finger engaging members in a fixed position relative to the guide surfaces for manual engagement by the fingers to hold said device while another finger is manually depressing said depressible member.

2. A structure defined in claim 1 in which the means for supporting the cutting member includes a member having a generally T-shaped configuration with the transverse portion thereof connected to the guide surfaces and, with the stem thereof having means for grippingly engaging the head of the cutting blade.

3. A structure defined in claim 1 having means for maintaining the depressible member in a depressed position, with the cutting edge extending through the slot.

4. A trimming device comprising a pair of guide surfaces positioned substantially at right angles to each other and defining a central edge between said guide surfaces, a slot within said central edge, a cutting member having a cutting edge, means for centrally supporting said cutting member substantially equidistant between said guide surfaces, said means comprising a generally T-shaped member having a transverse portion and a centrally positioned stem which stem is positioned substantially equidistant between said guide surfaces with the transverse portion connected to the opposite guide surfaces and the stem having means for holding the cutting member, said stem being depressible to cause the cutting edge of the cutting member to extend through the slot for a cutting operation.

References Cited

UNITED STATES PATENTS

| 1,129,310 | 2/1915 | Platt | 30—293 X |
| 2,253,099 | 8/1941 | Shaffer | 30—294 X |
| 3,110,104 | 11/1963 | Wicki et al. | 30—293 |

JAMES L. JONES, JR., *Primary Examiner.*